No. 654,033. Patented July 17, 1900.
E. F. STEWART.
WATER FILTER.
(Application filed May 18, 1900.)
(No Model.)
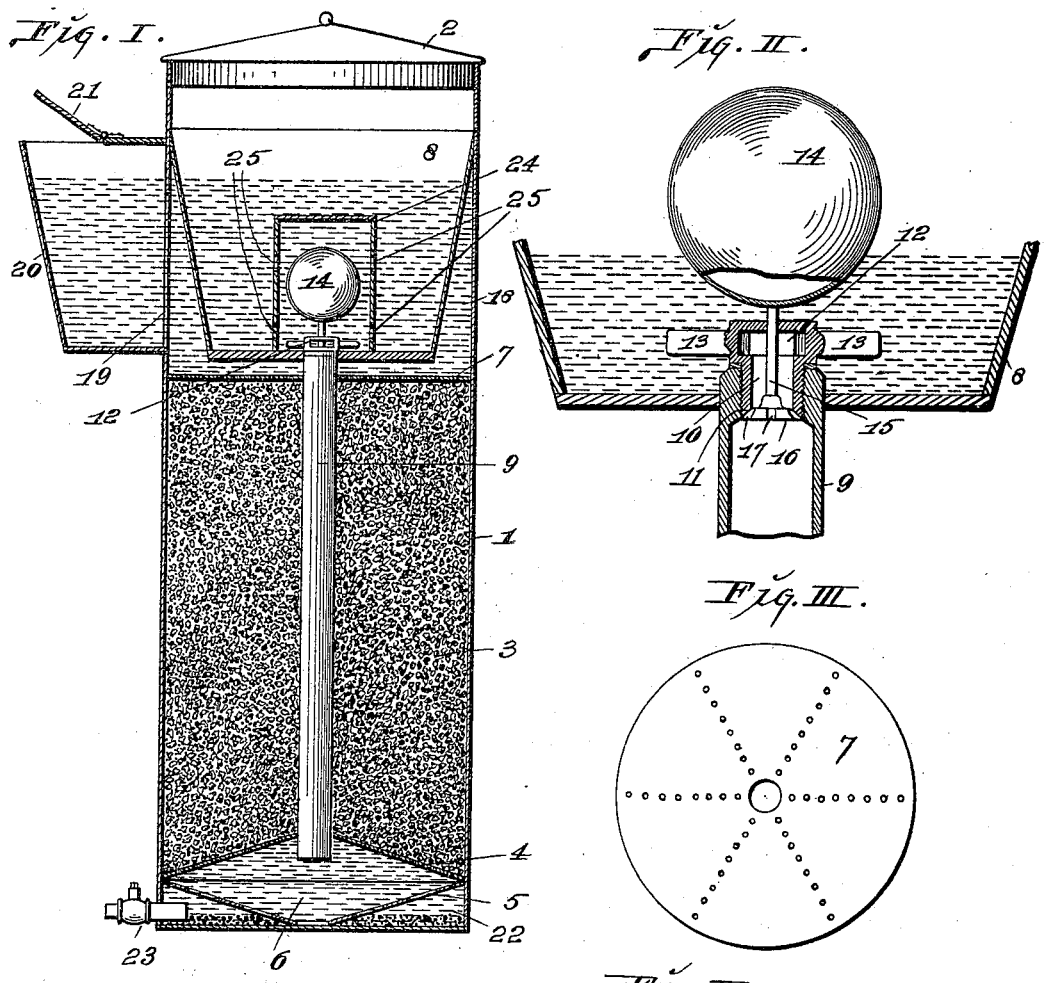
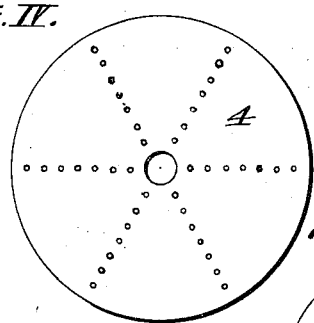
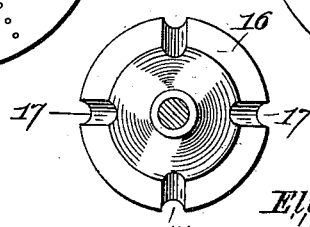
Inventor:—
Elijah F. Stewart
By Wright Bros
Atty's.
Attest:—
O. G. Roe
M. P. Smith
THE NORRIS PETERS CO., PHOTO-LITHO., WASHINGTON, D. C.

UNITED STATES PATENT OFFICE.

ELIJAH F. STEWART, OF ST. LOUIS, MISSOURI, ASSIGNOR TO THE SIMMONS HARDWARE COMPANY, OF SAME PLACE.

WATER-FILTER.

SPECIFICATION forming part of Letters Patent No. 654,033, dated July 17, 1900.

Application filed May 18, 1900. Serial No. 17,083. (No model.)

*To all whom it may concern:*

Be it known that I, ELIJAH F. STEWART, a citizen of the United States, residing at the city of St. Louis, in the State of Missouri, have invented certain new and useful Improvements in Feed-Regulators for Water-Filters, of which the following is a full, clear, and exact description, reference being had to the accompanying drawings, forming part of this specification.

My invention relates to a water-filter, and has for its object to provide means in a device of the class named whereby the quantity of water passing to the filtering medium from a supply-tank is automatically controlled to feed the water gradually and uniformly to the filtering medium, so that it is not forced rapidly therethrough in the filtering operation, but instead percolates slowly to accomplish proper filtration.

My invention consists in features of novelty hereinafter fully described, and pointed out in the claims.

Figure I is a vertical sectional view taken through a filter equipped with my improvement. Fig. II is an enlarged sectional view through the regulator and the water-supply tank. Fig. III is a detail view of the perforated plate surmounting the filtering medium. Fig. IV is a detail view of the perforated plate located immediately beneath the filtering medium. Fig. V is a detail view of the perforated disk by which the lower perforated plate is supported. Fig. VI is an enlarged detail view of the grooved valve of the regulator.

1 designates the shell of the filter, open at its upper end and provided with a cover 2. Within the shell 1 is a body of filtering material 3 of any suitable description, such as charcoal. The filtering material 3 is located above a perforated plate 4, concavo-convex in shape, and the plate 4 is supported by a perforated disk 5, also of concavo-convex shape, between which plate and disk is a chamber 6, that receives the water to be filtered as it is delivered therethrough from the supply-tank, as will hereinafter appear. The filtering material is surmounted by a perforated plate 7.

8 designates a supply-tank into which the water to be filtered is introduced, said supply-tank being suitably supported within the shell 1 at its upper end.

9 is a conveying-pipe secured to the tank 8, at the bottom thereof, and extending downwardly through the filtering material to the chamber 6 between the plate 4 and disk 5. Seated in the upper end of the conveying-pipe 9 is a tubular valve-housing 10, provided with a valve-seat 11 and having apertures 12 in its wall, that provide communication from the tank 8 into the pipe 9. The valve-housing 10 is equipped with arms 13, by which it may be easily turned to connect it to the pipe 9.

14 designates a float located in the tank 8 and having connected to it a stem 15, that carries a valve 16, located beneath the valve-housing 10 and adapted to be brought into contact with the valve-seat 11 of said housing. The valve 16 is provided with grooves 17 at its edge, (see Figs. II and VI,) that provide passage-ways from the interior of the housing 10 into the conveying-pipe 9 when the valve is seated against the housing, the purpose of which will hereinafter appear.

Surrounding the tank 8 is a clear-water chamber 18, that has communication through an aperture 19 in the wall of the shell 1 into a clear-water reservoir 20, provided with a lid 21. Beneath the disk 5 is a mud-chamber 22, into which enters a valved pipe 23, through which the sediment deposited in the mud-chamber may be extracted.

The float 14 is inclosed by a housing 24, provided with apertures 25, through which the water enters from the main portion of the tank to obtain access to the valve-housing 10 and to surround the float.

In the operation of the filter the water to be filtered is introduced into the tank 8 and passes through the apertures in the housing 24 to the conveying-pipe 9, into which it gains entrance through the apertures 12 in the valve-housing 10. The float 14 is normally held suspended in the water and supports the valve 16 against the seat 11 of the valve-housing 10. With the valve seated as stated it is necessary for the water passing from the tank 8 into the pipe 9 to flow only through the grooves 17 in said valve to pass into the pipe 9, and thereby the quantity of water entering said pipe is regulated so that its flow into the pipe is gradual, with the result that the water is delivered gradually to the chamber 6 at the lower end of the filter and into which the pipe 9 empties. Therefore the amount of water delivered to the body of filtering material 3 is controlled according to the requirements of a slow and steady feed of the water to accomplish proper filtration. The water percolates slowly upwardly through the body of filtering material, seeking the level of the water contained by the tank 8, and after passing through the filtering material enters the chamber 18 and flows therefrom into the clear-water reservoir 20 in a filtered condition. The float 14 remains elevated so long as there is sufficient water in the tank 8 to support it. As soon as the supply of water has become diminished to a sufficient extent to allow the float to fall the valve 16 recedes from its seat, and each time that it does so the water remaining in the tank 8 passes more rapidly into the pipe 9 and acts as a flush to remove any mud or sediment from the valve 16 or the seat 11.

I claim as my invention—

1. An automatic regulator for water-filters comprising an apertured valve-housing, a float, and a grooved valve carried by said float adapted to contact with said valve-housing, substantially as described.

2. In a device of the character described, the combination of a tank, a pipe leading therefrom, an apertured valve-housing seated in said pipe and provided with a valve-seat, a float located in said tank, and a grooved valve carried by said float adapted to contact with the valve-seat of said housing, substantially as described.

3. In a device of the character described, the combination of the shell containing a chamber at its upper end, a tank located in said chamber, a body of filtering material located beneath said chamber, a pipe leading from said tank through said filtering material, an apertured valve-housing located in the upper end of said pipe, and having a valve-seat, a float arranged in said tank, and a grooved valve carried by said float adapted to contact with said valve-seat, substantially as described.

ELIJAH F. STEWART.

In presence of—
E. S. KNIGHT,
N. V. ALEXANDER.